March 31, 1964 R. F. SHARROW ETAL 3,126,618
METHOD OF MANUFACTURING ARMATURES
Filed Oct. 13, 1959

INVENTORS
ROBERT F. SHARROW
BURDEAN D. GUBI
BY Vernon N. Kalb
ATTORNEY

United States Patent Office 3,126,618
Patented Mar. 31, 1964

3,126,618
METHOD OF MANUFACTURING ARMATURES
Robert F. Sharrow, Erie, and Burdean D. Gubi, North East, Pa., assignors to General Electric Company, a corporation of New York
Filed Oct. 13, 1959, Ser. No. 846,096
3 Claims. (Cl. 29—155.53)

This invention relates to dynamoelectric machine armatures, and more particularly relates to a method of manufacturing random wound armatures.

In the construction of armatures having two coil sides lying in axial slots on the rotary dynamoelectric machine, difficulty has been presented in connecting the coil leads with the commutator segments. For example, in a 2-pole machine, an armature coil is wound in complementary slots approximately 180 electrical degrees apart; each coil may be composed of a plurality of turns through each pair of complementary slots. Furthermore, a bundle of wires may be wound in each pair of complementary slots, thereby requiring a number of commutator segments equal to the number of armature slots multiplied by the number of electrical conductors in the bundle. The usual procedure in placing windings on a random wound armature is to provide a bundle of conductors, wind a coil having a plurality of turns in one pair of complementary slots, cut off the conductors in the bundle after the last inductor has been placed in an armature slot to provide coil leads to the commutator, and progressively repeat this procedure for each pair of complementary armature slots, and then repeat the overall procedure to provide two coils in each pair of complementary slots. When this winding procedure has been completed, it may be seen that a conductor or a plurality of conductors in a bundle extends from the top and bottom of each slot. These coil leads must be connected to the commutator in proper sequence to provide the desired electrical circuit. Usually the commutator is provided with risers having slots adapted to receive the coil leads.

In a lap wound coil, sides of a given coil are connected to adjacent commutator segments as illustrated in FIGURE 1. For example, one end of a coil connects to the bottom of a commutator riser and the other end of the same coil connects to the top of an adjacent commutator riser. The difficulty presented is that half of the bottom coil sides must be connected to tops of commutator segment risers, and half of the top coil sides must be connected to the bottom of commutator segment risers to achieve the desired armature winding. This requires that one half the total number of bottom leads cross over the top leads and the end winding of top coils. This crossing over has heretofore been accomplished on the commutator end of the armature, and the crossing may be reflected into the slot due to application of pressure and tension to the leads.

This crossover wastes slot space and is particularly undesirable where a high slot space factor is required. Additionally, when the top and bottom coil leads are crossed over, and the bottom coil leads are crossed over the top coil front end turns, insulation fraying or damage may occur, resulting in grounding of a coil to the armature core, or shorting of coil leads to coils. Additionally, care must be taken to make the proper connection between a coil lead and a commutator segment, due to the crossovers, inasmuch as confusion may be presented if the top and bottom coil leads are not so labeled or marked to indicate to the person constructing the armature which are top and bottom leads. Generally, the industry has just lived with the problem. The problem, of course, is not presented where pre-formed rectangular coils are placed in the armature slots, but only where random windings are used.

In view of this long-existing armature winding and commutator connection problem, we provide a method of placing random wound armature coils on an armature which presents minimum crossover problems and obviates the necessity for marking or labeling the coil leads "top" and "bottom."

Accordingly, it is a primary object of our invention to provide a simple, improved method of winding and connecting random wound armature coils which yields a high armature slot space factor.

It is another object of our invention to provide a method for arranging random wound coils on an armature which minimizes the possibility of shorting and grounding of coils.

It is a further object of our invention to provide a method of placing random windings on an armature wherein the coil leads extending from the slots are initially positioned as "top" or "bottom" leads.

Briefly stated, the objects of our invention are achieved by providing a novel armature coil winding method wherein crossover of top and bottom coil sides in a common armature slot occur without the slot at the non-commutator end of the armature.

The novel features of our invention are set forth in the appended claims. The invention itself, however, both as to its organization and method of operation, together with further objects and advantages thereof, may best be understood by reference to the following description when taken in connection with the following drawing wherein:

Figure 1:
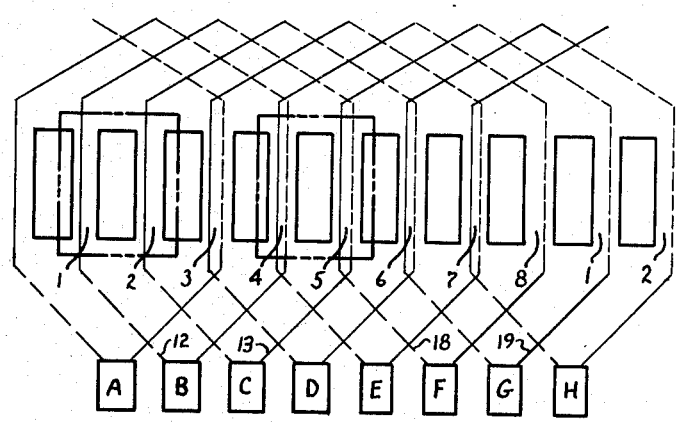
FIGURE 1 is a flat developed view of a lap armature winding given for purposes of illustration.

Referring now to FIG. 1, we show a developed diagram of a 2-pole, 8-slot, lap wound armature. This diagram is given for purposes of illustration and orientation only. Armature slots 1–8 are provided in the armature core to receive electrical windings. The armature coils are connected to appropriate commutator segments A—H. In practice, one coil side is on top of a second coil side. This means that when the coil leads are brought out from each slot, there will be a bottom lead and a top lead, and a slot at each commutator segment riser for receiving both a bottom and top lead. Prior to our invention, the practice has been to bring a bottom lead up over the top lead and top coil end windings, and connect these leads to the commutator segments so that each coil side is connected in the bottom of one commutator riser and in the top of a second commutator riser. For example, with the conventional prior art winding techniques some slots would naturally have a coil lead emerging from the bottom of the slot for connection to the bottom of a commutator riser and a coil lead emerging from the top of the slot for connection to the top of a commutator riser. The associated complementary slots, however, would have both coils leads naturally emerging from the lower portion of the slot, that is about half way up from the bottom. To maintain the same connecting sequence, however, the coil lead which emerges from the lower portion of the complementary slot and which is associated with the first or lower coil side wound therein must connect to the top of its commutator riser while the coil lead which emerges from essentially the same portion of the complementary slot but which is associated with the second or upper coil side wound therein must connect to the bottom of its commutator rise. To accomplish this the coil leads must, of course, be crossed-over. As previously pointed out, these crossovers are difficult to accomplish when there are many leads extending from the armature slots.

In accordance with our invention, we provide a method of placing random windings in the armature slots which insures that coil leads to be placed in the bottom of a riser slot extend from the bottom of an armature slot and coil leads adapted to be placed in the top of a riser slot extend from the top of an armature slot.

Figure 2:
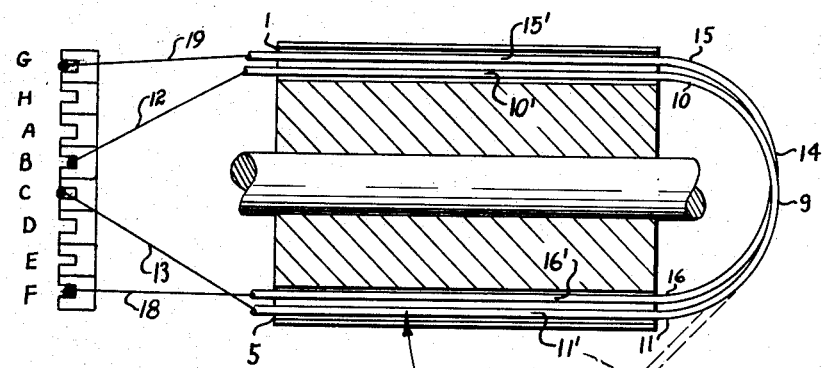
FIGURE 2 is illustrative of an intermediate step in our invention.

Reference is now made to FIG. 2, which shows a section through the center of an armature core adapted to receive a 2-pole random lap winding. Armature slots 1 and 5 corresponding to armature slots 1 and 5 of FIG. 1, are displaced from each other 180 electrical degrees. A coil 9, having coil sides 10 and 11, is first wound in the bottom portions of the pair of complementary slots 1 and 5, and temporarily secured therein by any suitable means such as placing a wooden spacer stick, not shown, in the slot. As is well understood, the coils include a number of turns with associated front-end turns at the commutator end of the armature and back-end turns at the end thereof opposite the commutator. For simplicity, however, not all of the coil turns and end turns have been illustrated in FIG. 2 but only the coil half-turns whose ends extend from the armature slots to provide the coil leads for connection to the commutator risers. Also, only the pair of complementary slots 1-5 are shown although it will bt understood that for the layout shown in FIG. 1 there will be similar coils wound in the slots 2—6, 3—7 and 4—8.

As shown in FIG. 2, therefore, there is a coil 9 wound in the bottom portion, or bottom half, of the slots 1 and 5 and a coil 14 wound in the top half of these same slots 1—5. Coil lead 12 is the emerging end of the first half-turn of coil 9, with the portion within the slot designated as inductor 10′, and coil lead 13 is the emerging end of the last half-turn thereof, with the portion within the slot being designated 11′. Similarly, coil lead 18 is the emerging end of the first half-turn of coil 14, with the portion within the slot designated as inductor 16′ and coil lead 19 is the emerging end of the last half-turn thereof, with the portion within the slot designated as inductor 15′.

To achieve the proper connections to the commutator, coil lead 12 connects to the bottom of commutator riser B while coil lead 13 connects to the top of the adjacent commutator riser C. Similarly, coil lead 18 connects to the bottom of commutator riser F while coil lead 19 connects to the top of commutator G. That is, the coil lead which is the extension of the first half-turn of a coil connects to the bottom of the appropriate commutator riser and the coil lead which is the extension of the last half-turn of a coil connects to top of the appropriate commutator riser. Since FIG. 2 illustrates the armature wound in accordance with the method of this invention, it will be observed that the coil leads required to be connected to the bottom of the commutator risers all emerge from the lower portion of the armature slots while the coil leads required to be connected to the top of the commutator risers all emerge from the top of the armature slots. The term "lower portion" is used here since only the coil leads from the first half-turn of the coils in slots 1, 2, 3 and 4 can actually lie at the very bottom of the slot. The others will lie either about half way up from the bottom or at the top as is readily apparent since the coils include a number of turns. At any rate, by winding according to this invention, only coil leads which emerge from the top of the slots connect to the top of commutator risers with all others, whether emerging from the very bottom or part way up therefrom, are referred to as emerging from the lower portion of the slot and connect to the bottom of the commutator risers.

Figure 3:
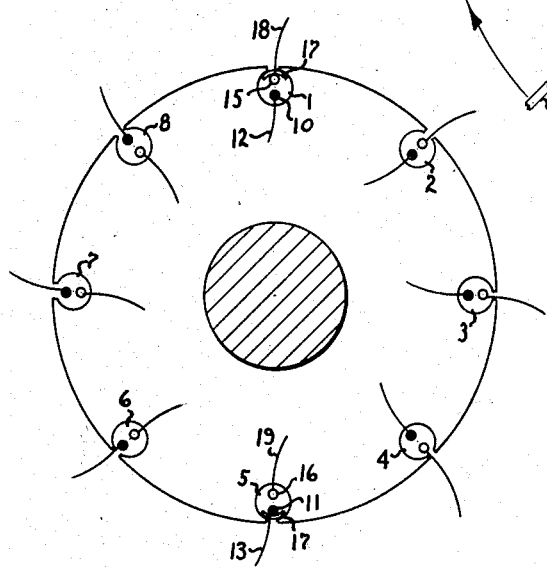
FIGURE 3 is an end view of an armature which is wound in accordance with our invention, seen from the commutator.

This is accomplished in accordance with this invention by first winding coils in the appropriate pairs of complementary slots until the bottom portion of each slot has a coil side lying therein. For example, coils are wound in slots 1—5, 2—6, 3—7 and 4—8 thereby filling the bottom portion of each slot with a coil side. The coil sides so placed are temporarily secured therein by any suitable means. Coil leads will now be emerging from each of these slots but all coil leads will emerge from the bottom or lower portion of the slots. A second armature coil is now placed in each pair of complementary slots in the following manner: The coil sides securing members are removed from complementary slots 1—5, and the last half turn of coil side 11, that is, inductor 11′ and its extending coil lead 13, is removed from slot 5. Coil 14 is then wound in complementary slots 5 and 1, having coil sides 15 and 16 and inductors 15′ and 16′ in slots 1 and 5 respectively. After coil 14 has been wound in the slots 5 and 1, inductor 11′ and its extending coil lead 13 of coil 9 is replaced in slot 5 on top of all other inductors therein, and slot wedges 17 as shown in FIG. 3 are inserted to secure the coil sides in the slots 1 and 5. Coil lead 18 of coil 14 extends as a bottom connection to riser, while coil lead 19 of coil 14 extends as a top connection to riser. This last-mentioned winding procedure is repeated for each armature coil. The salient feature of this winding method is that all crossovers between top and bottom coil sides are made at the non-commutator end of the armature.

After all coils have been placed on the armature, the bottom leads are placed in appropriate riser slots as shown in FIG. 2. In FIG. 2, connections from the coil sides are shown to risers of commutator segments B, C, F and G, corresponding to the connections of FIG. 1. The risers are illustrated in FIG. 2 as a developed view as seen from the armature core. After all bottom leads have been placed in the appropriate commutator segment risers, the top leads are then placed in appropriate riser slots. As the connections are made, insulating tape may be wound about the armature shaft and leads in a manner known to those skilled in the art to insulate the leads from one another and secure the leads.

Reference is now made to FIG. 3, which shows a view of the armature seen from the commutator prior to connection of the coil sides to the commutator segments. It will be noted that the leads for each coil extend from one slot as a bottom lead, and from the complementary slot as a top lead, thereby facilitating appropriate connection of the leads to the slots and the commutator riser. All leads which extend from the lower slot portion are arranged to be easily accessible for placement in the bottom of the riser slots.

It is to be realized that each coil usually comprises a plurality of turns of a conductor bundle through complementary slots, and therefore there will be a number of leads extending from each slot equal to twice the number of conductors in the bundle. When it is considered that each bundle of conductors may consist of four wires, and the number of armature slots may total twenty, it is readily seen how our novel winding method facilitates connection of individual wires to the proper riser slot. No crossing over of conductor bundles is required at the commutator end of the armature, because all wires extending as coil leads from other than the top of an armature slot are placed in the bottoms of the riser slot, and all top conductors extending from each slot are then placed in the top of the appropriate commutator riser slot. Inasmuch as there are no crossovers of coil sides within the slots, the slot space factor is greatly enhanced, and further, wedges may more easily be inserted in the armature slots. Heretofore, in random wound armatures wound with high slot space factors and coil side crossovers within the slot, it was difficult to insert the wedges and quite often wedges were destroyed or winding insulation was damaged when attempts were made to force the wedges into the armature slot.

While we have described our invention as used in winding a 2-pole, 8-slot, random lap wound armature, it is to be understood that our novel method is not limited to such a specific machine, but is applicable to any random wound armature. Moreover, while a specific order of steps has been given for purposes of illustration in disclosing our invention, variations may be made in the given order of steps without departing from the spirit and scope of the invention. It is therefore our intention in the appended claims to cover all changes and modifications of the example of the invention herein chosen for purposes of illustration which do not depart from the spirit and scope of the invention.

What we claim as new and desire to secure by Letters Patent of the United States is:

1. A method of random winding coils in the longitudinally extending slots of a dynamoelectric machine armature so that the coil leads required to be connected to the bottom of the risers of the armature commutator extend from the lower portion of the armature slots and the coil leads required to be connected to the top of the commutator risers extend from the top of the armature slots which method comprises:
   (a) providing an electrical conductor adapted for random winding about an armature core adapted to have a commutator mounted on one end;
   (b) placing a portion of said conductor in a first armature slot and winding said conductor longitudinally about said armature core in a first slot and a first complementary slot to form a first random wound coil lying in the lower portion of said first and complementary armature slots and having coil leads extending therefrom toward the commutator end of said armature;
   (c) repeating the foregoing procedure with an electrical conductor in each pair of complementary slots until all armature slots have a similar coil side lying in the lower portion thereof;
   (d) removing from the first complementary slot only the coil half-turn whose end provides the coil lead extending therefrom;
   (e) winding a second conductor in the first complementary slot and said first armature slot on top of the conductors making up the coil sides already lying therein to form a second random wound coil having coil leads extending toward the commutator end of said armature core from the lower portion of said complementary slot and the top of said first armature slot;
   (f) replacing the removed coil half-turn on top of the coil side lying in the upper portion of said complementary slot so that the end thereof which provides the coil lead for the coil side in the lower portion of such slot extends from the top of said complementary slot toward the commutator end of said armature core;
   (g) repeating the last-mentioned winding procedure recited in steps d, e and f for each remaining pair of complementary slots until each armature core slot has two coil sides lying therein.

2. The method of claim 1 wherein said electrical conductor adapted for random winding about the armature core comprises a number of individual wires forming a conductor bundle.

3. The method of random winding the coils in a dynamoelectric machine armature which comprises:
   (a) providing an armature core having longitudinal coil receiving slots defined therein and adapted to have a commutator assembly having commutator risers thereon mounted on one end of said core;
   (b) placing a portion of an electrical conductor adapted for random winding in a first armature slot;
   (c) winding the conductor longitudinally about said armature core in the first slot and a first complementary slot to form a first random wound coil lying in the lower portion of said first and complementary armature slots and having coil leads extending therefrom toward the commutator end of said armature;
   (d) repeating the foregoing procedure with an electrical conductor in each pair of complementary slots until all armature slots have a coil side lying in the lower portion thereof;
   (e) removing from the first complementary slot the coil half-turn whose end provides the coil lead extending therefrom;
   (f) winding a second conductor in the first complementary slot and said first armature slot on top of the coil sides already lying therein to form a second random wound coil having coil leads extending toward the commutator end of said armature core from the lower portion of said complementary slot and the top of said first armature slot;
   (g) replacing the removed coil half-turn on top of the coil side lying in the upper portion of said complementary slot so that the end thereof which provides the coil lead for the coil side in the lower portion of such slot extends from the top of said complementary slot toward the commutator end of said armature core;
   (h) repeating the last-mentioned winding procedure recited in steps e, f, and g for each remaining pair of complementary slots until each armature core slot has two coil sides lying therein;
   (i) mounting the commutator assembly on the one end of said armature core; and
   (j) connecting all coil leads extending from the lower portion of the armature slots to the bottom portion of the commutator risers and all coil leads extending from the top of the armature slots to the top portion of the commutator risers in a predetermined pattern.

References Cited in the file of this patent

UNITED STATES PATENTS

| | | |
|---|---|---|
| 2,361,842 | Heintz et al. | Oct. 31, 1944 |
| 2,385,619 | Fausset et al. | Sept. 25, 1945 |
| 2,400,902 | Allen | Mar. 28, 1946 |
| 2,660,682 | Clokey et al. | Nov. 24, 1953 |
| 2,844,749 | Shetterly | July 22, 1958 |